United States Patent [19]
Wiener

[11] 3,995,342
[45] Dec. 7, 1976

[54] DOCKBOARD HAVING TRUCK BED SENSORS

[75] Inventor: Thomas J. Wiener, Brown Deer, Wis.

[73] Assignee: Kelley Company, Inc., Milwaukee, Wis.

[22] Filed: Jan. 26, 1976

[21] Appl. No.: 652,074

[52] U.S. Cl. ............................................. 14/71.3
[51] Int. Cl.² ........................................ B65G 11/00
[58] Field of Search ..................... 14/71 M, 71 R

[56] References Cited
UNITED STATES PATENTS

| | | | |
|---|---|---|---|
| 3,137,017 | 6/1964 | Pfleger | 14/71 M |
| 3,858,264 | 1/1975 | Kuhns | 14/71 M |
| 3,877,102 | 4/1975 | Artzberger | 14/71 M |
| 3,902,213 | 9/1975 | Pfleger | 14/71 M |

*Primary Examiner*—Nile C. Byers, Jr.
*Attorney, Agent, or Firm*—Andrus, Sceales, Starke & Sawall

[57] ABSTRACT

A dockboard incorporating a truck bed sensing mechanism. The dockboard includes a ramp which is hinged at its rear edge to the loading dock and a lip is pivoted to the forward edge of the ramp and is movable between a downwardly hanging pendant position and an extended position. Safety legs are mounted on the underside of the ramp and are movable between an upright operable position, in which the legs support the ramp against downward movement, and a retracted or inoperable position. Pivoted to the underside of the lip are a series of truck bed sensors which are provided with a shorter length than the lip. The sensors are operably connected to the safety legs, whereby downward movement of the sensors from an extended position will effect movement of the legs to the supporting position. The lip, when in the extended position, and the sensors are adapted to engage a truck bed during a loading or unloading operation. If a truck pulls away from the dock with a load on the ramp, the sensors, being of a shorter length than the lip, will lose contact with the truck bed before the lip loses contact with the truck bed, so that the sensors will pivot downward while the lip is still extended, thereby enabling the legs to move to the supporting position to restrain downward movement of the ramp when the truck bed moves out of engagement with the lip.

17 Claims, 7 Drawing Figures

DOCKBOARD HAVING TRUCK BED SENSORS

BACKGROUND OF THE INVENTION

One common form of dockboard is mounted in a pit in a loading dock and includes a ramp which is hinged at its rear edge to the dock. An extension lip is pivoted to the front edge of the ramp and is movable between a downwardly hanging pendant position and an outwardly extended position where it forms an extension to the ramp.

The dockboard may also include cross traffic or safety legs which are pivoted to the ramp and when in the upright supporting position serve to support the ramp in a horizontal cross traffic position, as well as in a number of below dock level positions. As disclosed in U.S. Pat. No. 3,137,017, the legs are coupled to the lip so that when the lip moves upwardly from the pendant position toward the extended position, the legs will be pivoted to a retracted position. Conversely, when the lip moves downwardly from the extended position toward the pendant position after the loading operation is completed, the legs will pivot toward the upright supporting position.

With an upwardly biased dockboard as illustrated in U.S. Pat. No. 3,137,017, after the loading operation has been completed and the truck pulls away from the dock, the ramp, due to the upwardly biased condition, will remain in the position of loading but the lip will fall to the pendant position. If, after the loading is completed, the ramp is at an above dock level position, the operator merely walks out on the ramp and the weight of the operator will overcome the biasing effect to pivot the ramp downwardly to the cross traffic position where the safety legs will engage supports on the frame to support the ramp in the cross traffic position.

However, if the truck or carrier pulls away from the loading dock with a load on the ramp, such as a fork lift truck or cargo, the added weight on the ramp will overcome the upward bias effect and the ramp will drop rapidly, thereby tending to swing the lip upwardly with the result that the safety legs, which are coupled to the lip, may not be able to react quickly enough and move to their supporting position in time to catch the rapid descent of the ramp. This rapid descent of the ramp can cause the ramp to bottom out in the pit, causing damage to the dockboard or to the load on the ramp.

Various safety structures have been proposed in the past which would be responsive to rapid descent of the ramp to catch the ramp and prevent the descent. Such safety structures, for the most part, were complicated mechanisms and were actuated only after the lip lost contact with the truck bed and the ramp began to fall, and thus were not entirely effective in restraining the rapid descent of the ramp.

SUMMARY OF THE INVENTION

The invention relates to a dockboard which incorporates a truck bed sensing mechanism which will be activated to move the safety legs to the supporting position as the truck pulls away from the dock, but before the lip loses contact with the truck bed.

In accordance with the invention, one or more sensors are mounted within slots or recesses in the underside of the lip and each sensor has a shorter length than the lip so that the outer extremity of the sensor terminates a short distance from the outer extremity of the lip.

The sensors are pivotably mounted with respect to the lip and are operably connected to the safety legs, such that downward pivotal movement of the sensors from a generally horizontal extended position will effect movement of the safety legs to the upright supporting position.

A lip lifting mechanism acts to move the lip, along with the sensors, from the downwardly hanging pendant position to the extended position, and as the sensors move toward the extended position they act to pivot the safety legs to the reracted or inoperable position.

During the loading operation, both the lip and the sensors will rest on the truck bed. In the event the truck pulls away from the loading dock with an added load on the ramp, the sensors, being of a shorter length, will initially pivot downwardly by gravity before the lip loses contact with the truck bed. Downward pivotal movement of the sensors acts to enable the safety legs to be pivoted to the supporting position. Thus, by the time the lip has lost contact with the moving truck bed, the supporting legs will be moving toward the supporting position so that further downward movement of the ramp will be restrained.

With the use of the truck bed sensors of the invention, the safety legs will be moved toward the supporting position before the lip loses contact with the truck bed, and even if the ramp is subjected to a fast downward descent due to an added load on the ramp, the supporting legs will be in a position to restrain the descent and prevent damage to the dockboard as well as any cargo thereon.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
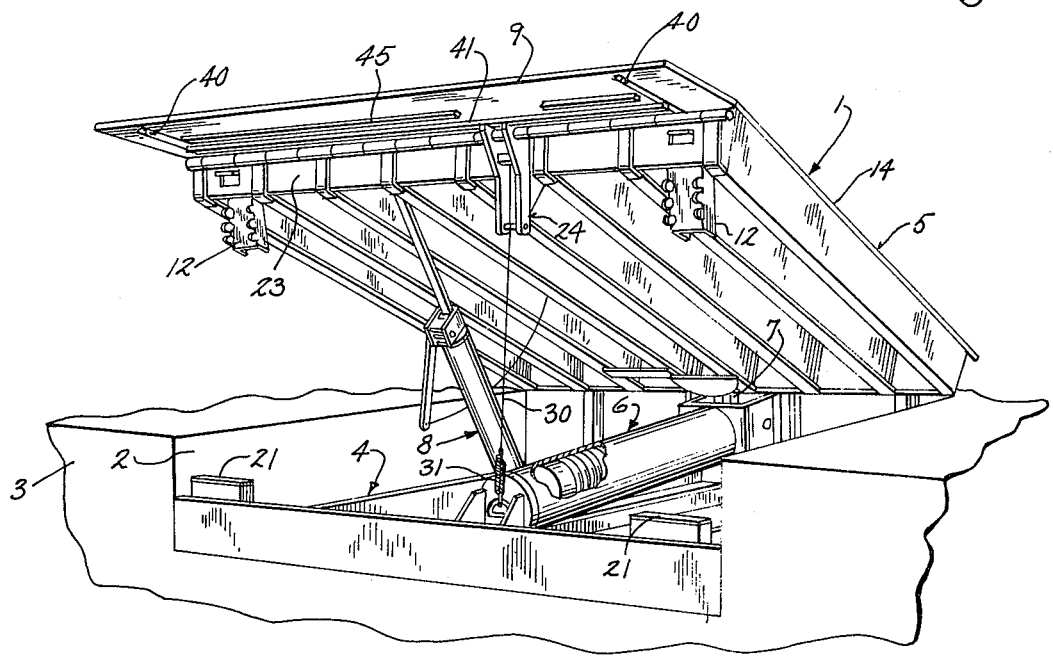
FIG. 1 is a perspective view of a dockboard incorporating the truck bed sensors of the invention with the ramp shown in the upwardly inclined position.

The drawings illustrate a dockboard 1 which is adapted to be mounted in a pit 2 or depression in a loading dock 3. The dockboard 1 includes a supporting structure or frame 4 and a ramp 5 is hinged at its rear edge to the frame.

As illustrated in the drawings, the dockboard is an upwardly biased type in which the ramp is biased upwardly to an inclined position by a counterbalancing spring assembly 6, similar to that shown in U.S. Pat. No. 3,528,118, which acts through a lever arm 7 attached to the rear edge of the ramp. The releasable holddown mechanism, indicated generally by 8, restrains upward movement of the ramp through force of the spring assembly 6, unless manually released. The holddown mechanism is a conventional type, such as that illustrated in U.S. Pat. No. 3,646,627.

Hinged to the front edge of the ramp 5 is an extension lip 9 which can be pivoted from a downwardly hanging pendant position to an outwardly extending position in which the lip forms an extension to the ramp. Upward pivotal movement of the lip with respect to the ramp is limited by engagement of the rear edge of the lip with the forward edge of the ramp. To pivot the lip 9 to the ramp 5, the lip and ramp are both provided with aligned hinge tubes 10 and hinge pin 11 is disposed within the hinge tubes 10 to provide the hinge connection.

Figure 2:
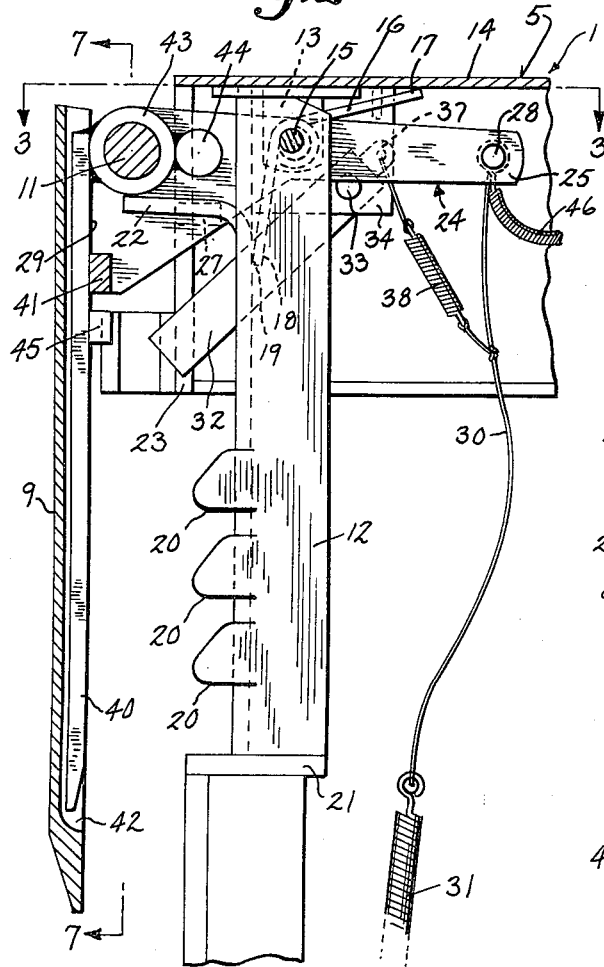
FIG. 2 is a fragmentary vertical section showing the truck bed sensors and safety legs when the ramp is in the cross traffic position.
Figure 4:
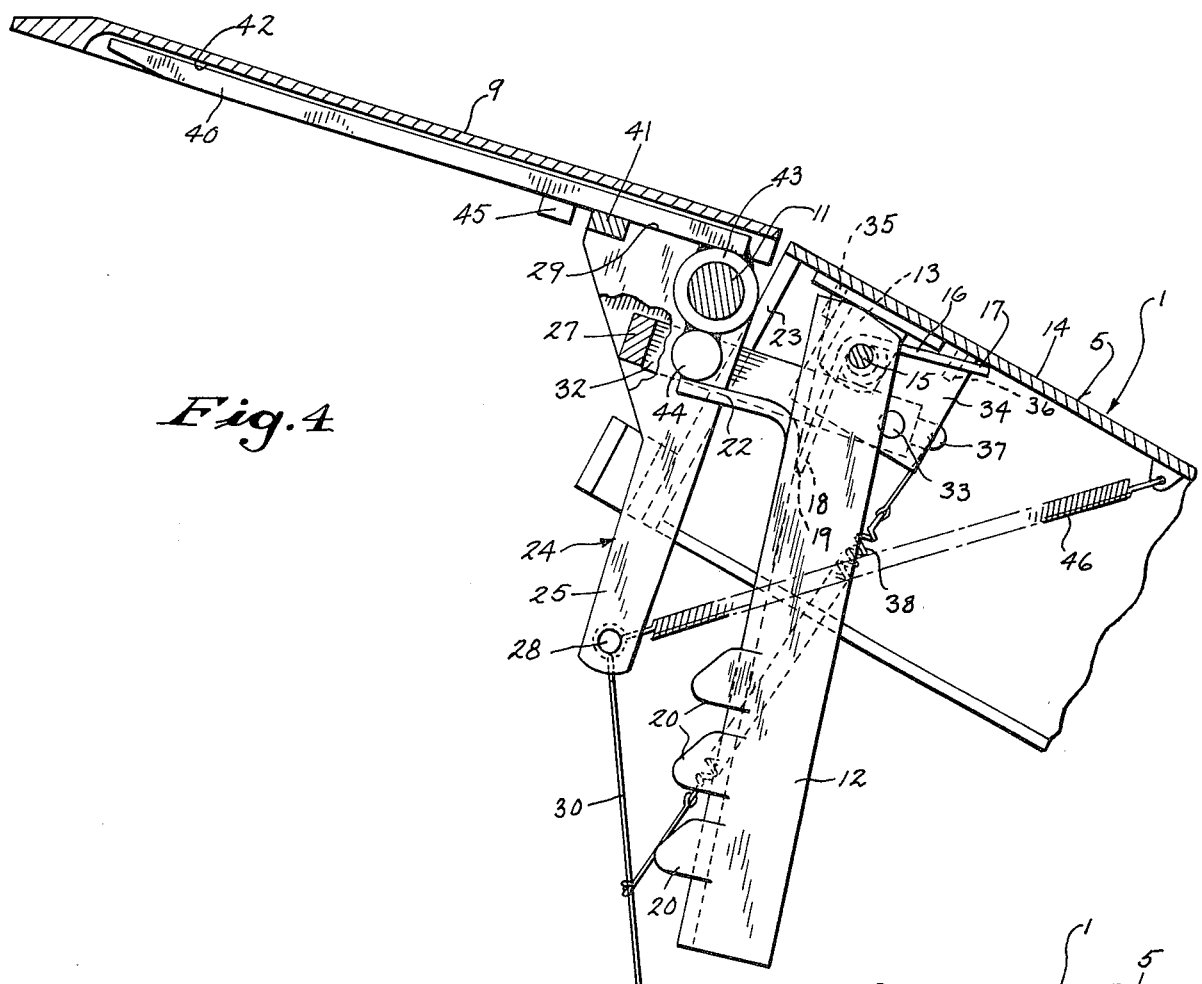
FIG. 4 is a view similar to FIG. 2 showing the position of the mechanism when the ramp is elevated and the lip is in the partially extended position.

A pair of support legs 12, which can be constructed similar to that shown in U.S. Pat. No. 3,137,017, are hinged to the underside of the ramp and are movable between an upright supporting position, as shown in FIG. 2, and an inoperative retracted position, as shown in FIG. 4. Each of the legs 12 is pivoted to a pair of lugs 13 that extend downwardly from the deck plate 14 of ramp 5 by a pin 15. To urge the legs to the supporting position, a torsion spring 16 is disposed around the pin 15 and one end 17 of the spring bears against the deck plate 14, while the opposite end 18 of the spring bears against the front surface 19 of the leg 12. The force of the spring 16 acts to urge or bias each leg to the upright supporting position, shown in FIG. 2.

The support legs 12 are preferably formed with a series of spaced abutments 20. Engagement of the lower ends of the legs or one of the abutments 20, with supports 21 on the frame 4 will act to support the ramp in a number of elevations. Normally, the engagement of the lower ends of legs 12 with the supports 21 will support the ramp in a horizontal cross traffic position, while engagement of the abutments 20 with the supports 21 will support the ramp at a series of downwardly inclined, below dock level positions.

The upper end of each leg 12 is provided with an outwardly extending flange 22 which extends through an opening in the header 23 of the ramp. Each flange 22 is adapted to be engaged by a wiper member on upward movement of the lip to pivot the leg to the retracted position, as will be described hereinafter.

The lip 9 is moved from the downwardly hanging pendant position to the extended position by a lip lifting mechanism indicated generally by 24. The lip lifting mechanism includes a pair of parallel crank arms 25 having aligned openings 26 which are journalled about the hinge pin 11. Connected between the arms 25 is a latch element or stop 27, and a pin 28 connects the outer ends of the arm. When the lip is in the pendant position, the outer ends of the arms 25 will be located directly beneath the deck plate 17 and the surface 29 of the arms will be engaged with the under surface of the lip. The arms 25 are adapted to be pivoted downwardly from the position shown in FIG. 2, to the position of FIG. 4, on elevation of the ramp, and the surface 29 will act to pivot the lip 9 toward the extended position.

To pivot the arms 25 downwardly and elevate the lip, a snap line 30 is connected to the pin 28, and the lower end of the snap line is connected through spring 31 to the supporting structure or frame 4. As the ramp is pivoted upwardly to the inclined position through operation of the counterbalancing spring assembly 6, the snap line 30 will become taut, thereby pivoting the arms 25 downwardly about the hinge pin 11 to move the lip toward the extended position.

A lip counterbalancing spring assembly, not shown, similar to that shown in U.S. Pat. No. 3,203,002, can be utilized to assist movement of the lip to the extended position.

The lip is latched or held in the partially extended position, short of its fully extended position, as shown in FIG. 4, by a latch bar 32 which is pivotally connected to the ramp by a pin 33 that extends between spaced plates 34 that extend downwardly from deck plate 14. Reinforcing members 35 and 36 are connected between the plates 34. Lug 37 is connected to the end of the latch bar 32, and the lug is connected by spring 38 to the snap line 30. With this arrangement, upward movement of the ramp, as previously described, will cause the snap line 30 to become taut to pivot the arms 25 and will also exert a force through the spring 38 to pivot the latch bar 32 upwardly to the latching position, as shown in FIG. 4.

The inertia of the lip pivoting upwardly will move the lip to the fully extended position and the lip will then fall slightly to the partially extended position, shown in FIG. 4, where the latch element 27 will engage the end of latch bar 32 to thereby hold the lip in the partially extended position.

Figure 5:
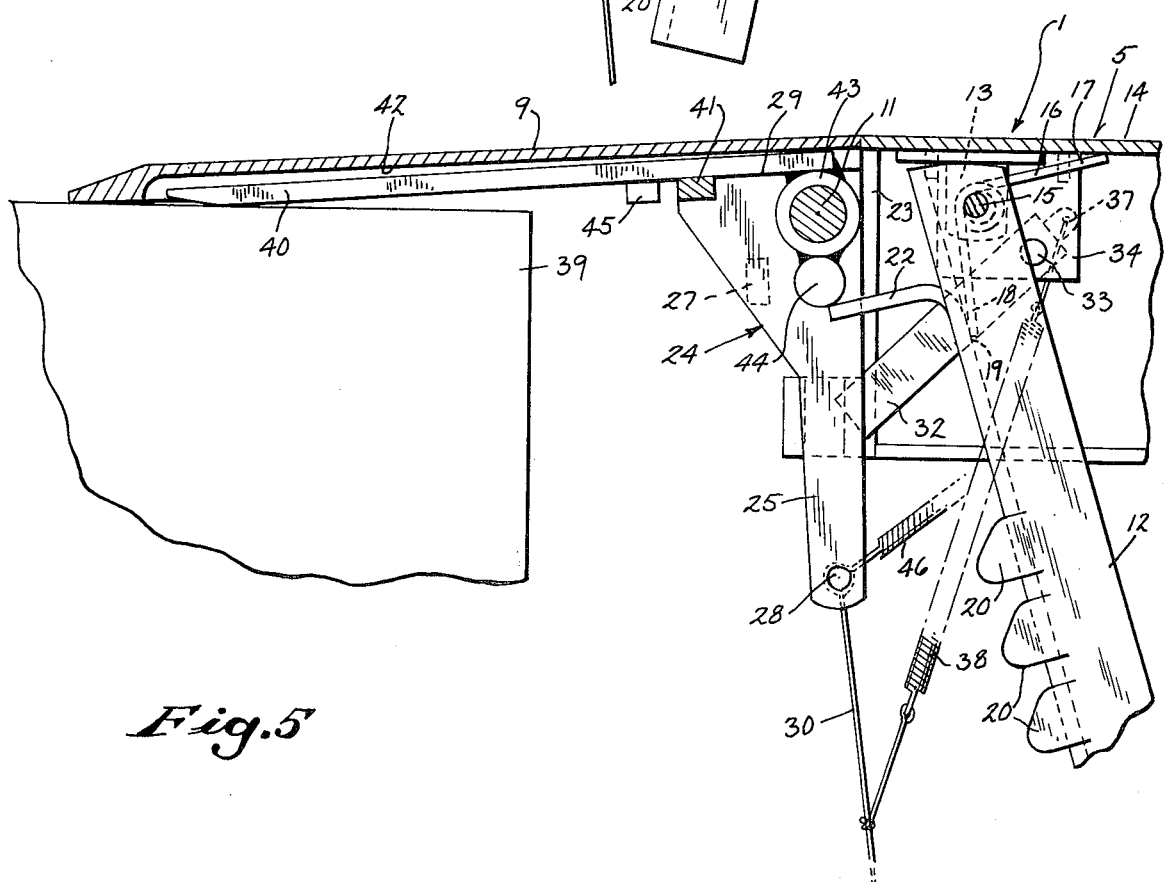
FIG. 5 is a view similar to FIG. 3, showing the lip and sensors in engagement with the truck bed.

When the ramp 5 is walked downwardly by the operator, overcoming the biasing effect of spring assembly 6, the extended lip 9 will engage the truck bed 39 causing the lip to move to the fully extended position, thereby removing the weight of the lip from the latch bar 32. With the weight of the lip removed, and as the line 30 at this time is slack, the latch bar 32 will pivot downwardly by gravity to the inoperative position, as shown in FIG. 5.

As the lip holding mechanism is unlatched, the lip will then be free to pivot downwardly to the pendant position when the truck pulls away from the dock.

In accordance with the invention, a pair of truck bed sensors 40 are connected to the arms 25 of the lip lifting mechanism by a connecting bar 41. Each of the sensors 40 is mounted within a slot 42 formed in the underside of the lip 9, as shown in FIG. 2, and the sensors 40 have a length slightly less than the length of the lip 9, so that the outer end of each sensor terminates short of the outer extremity of the lip. The inner end of each sensor 40 is welded to a collar 43 which is journaled about the hinge pin 11, so that the sensors 40, collars 43 and arms 25 constitute an integral unit which can freely pivot downwardly with respect to the lip 9. A wiper member 44 is secured to each collar 43 and is adapted to engage the flange 22 of the respective support leg during upward pivotal movement of the arms 25 and sensors 40, to thereby move each leg from the upright supporting position to the retracted position.

A protective bar 45 can be secured to the underside of the lip forwardly of the connecting bar 41 in order to protect the bar 41 and prevent damage thereto.

OPERATION.

Figure 3:
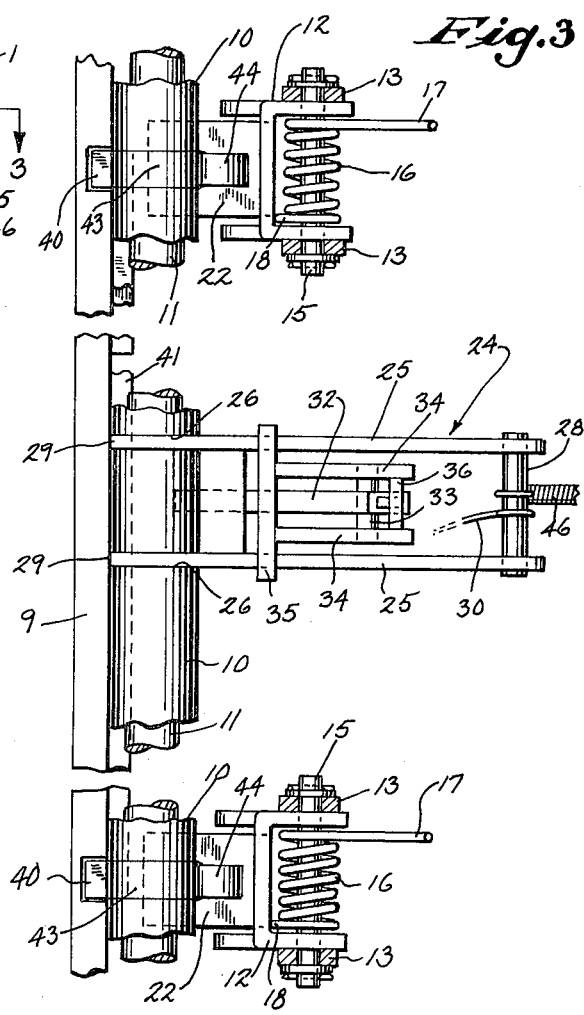
FIG. 3 is a section taken along line 3—3 of FIG. 2.

The cross traffic position of the ramp 5 is shown in FIG. 2. In this position the lip 9, as well as the sensors 40, which are located within the slots 42, are in the downwardly hanging pendant position and the support legs 12 are in the upright supporting position with the lower ends of the legs engaged with the supports 21. As shown in FIGS. 2 and 3, the lip lifting arms 25 are located beneath the deck plate 14 and the latch bar 32 is in the unlatched position. After a truck or carrier has backed toward the dock for a loading operation, the operator releases the holddown mechanism 8, causing the ramp 5 to pivot upwardly through the force of the counterbalancing spring 6. As the ramp pivots upwardly, the snap line 30 will become taut, thereby pivoting the arms 25 downwardly to raise the lip toward the extended position. Simultaneously, the arms 25 being engaged with the connecting bar 41 pivot the sensors 40 upwardly along with the lip. During this action, the spring 31 will operate to pivot the latch bar 32 to the latching position.

As the lip falls slightly from the fully extended position, the latch element 27 will engage the end of the latch bar 32 to hold the lip in the partially extended position, as shown in FIG. 4.

The pivotal movement of the lip lifting arms 25 also acts to pivot the sensors 40 upwardly along with the lip and upward pivotal movement of the sensors moves the wiper members 44 against the flanges 22 to pivot the supports legs 12 to the retracted position as shown in FIG. 4.

The operator then walks outwardly on the ramp and the added weight will overcome the force of the counterbalancing spring assembly 6, causing the ramp to slowly lower until the lip 9 and sensors 40 engage the bed of the truck. Engagement of the lip with the truck bed will cause the lip to pivot upwardly to the fully extended position, as shown in FIG. 5, thereby taking the weight off the latch bar 32. As the snap line 30 is slack at this time, the latch bar 32 will pivot downwardly by gravity to the inoperative position. As the lip holding mechanism is thus unlatched, the lip is free to fall to the pendant position after the truck pulls away from the loading dock.

Figure 6:
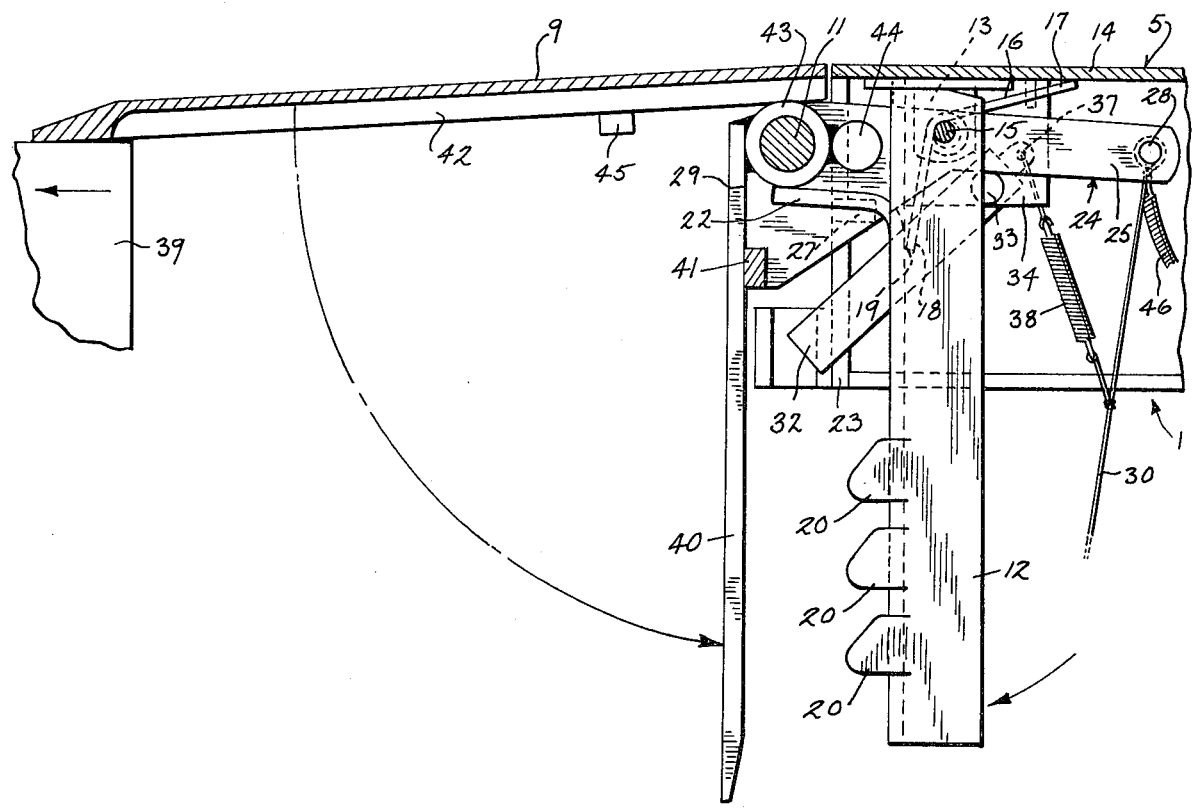
FIG. 6 is a view similar to FIG. 5, showing the position of the truck bed sensors after the truck bed loses contact with the sensors.
Figure 7:
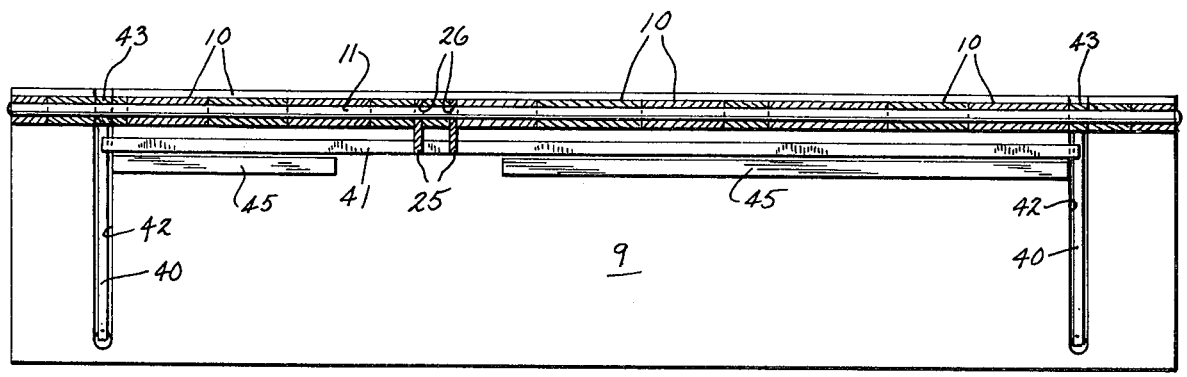
FIG. 7 is a plan view of the undersurface of the lip.

As the truck pulls away from the dock the sensors 40 will initially lose contact with the truck bed causing the sensors 40 and arms 25 to pivot downwardly by gravity. To aid the downward pivotal movement, a spring 46 can be connected between the pin 28 and the ramp 5 and the force of the spring will act to urge the arms 25, as well as the sensors 40, toward the position shown in FIG. 6.

As the sensors 40 pivot downwardly, the wiper member 44 will move out of contact with the flange 22 thereby enabling the torsion springs 16 to pivot the legs 12 forwardly to the supporting position. With this construction, the legs 12 will be urged toward the supporting position before the lip loses contact with the truck bed and this insures the support legs will be in a position to restrain rapid downward movement of the ramp if the truck pulls pulls away when an added load, such as cargo or material handling equipment, is on the ramp.

While the drawings illustrate the sensing mechanism in the form of the elongated bars or sensors 40 pivoted to the hinge pin 11, it is contemplated that other forms of sensors can be utilized which are operable to sense the presence of a carrier in front of the dock and are arranged so that they are deactivated or lose contact with the bed of the carrier before the lip loses contact with the carrier as the carrier pulls away from the dock.

Various modes of carrying out the invention are contemplated as being within the scope of the following claims particularly pointing out and distinctly claiming the subject matter which is regarded as the invention.

I claim:

1. In a dockboard, a supporting structure, a ramp hinged at its rear edge to the support structure and movable from a generally horizontal position to an upwardly inclined position, a lip hinged to the forward edge of the ramp and movable from a downwardly hanging pendant position to an outwardly extending position, said lip adapted to rest on a carrier located in front of the dock when the lip is in the extended position, ramp supporting means movable between a ramp supporting position, wherein said ramp supporting means will restrain downward movement of the ramp, and an inoperative position wherein said ramp supporting means will not interfere with downward movement of the ramp, sensing means to be engaged by a carrier located in front of the dock and disposed with respect to the lip, when the lip is in the extended position, so that said sensing means will be disengaged with respect to the carrier before the lip loses contact with the carrier as the carrier moves away from the dock, and means responsive to disengagement of the sensing means and the carrier for moving said ramp supporting means to the ramp supporting position to restrain descent of the ramp when the lip loses contact with said carrier.

2. In a dockboard, a supporting structure, a ramp hinged at its rear edge to the supporting structure and movable from a generally horizontal position to an upwardly inclined position, a lip hinged to the forward edge of the ramp and movable from a downwardly hanging pendant position to an outwardly extending position, said lip adapted to rest on a carrier located in front of the dock when the lip is in the extended position, a support leg connected to the ramp and movable between a supporting position and an inoperative position, means for moving the leg to the inoperative position, a sensor disposed to engage the carrier and movable from a carrier engaging position to a second position where the sensor is out of contact with said carrier, said sensor being positioned with respect to the lip so that said sensor will lose contact with the carrier before the lip loses contact with the carrier as the carrier moves away from the dock, and means responsive to the sensor losing contact with said carrier as the carrier moves away from the dock for effecting movement of said leg from the inoperative position to the supporting position to thereby restrain downward movement of the ramp when the lip loses contact with the carrier.

3. The dockboard of claim 2, wherein said sensor is freely pivotable with respect to the lip.

4. The dockboard of claim 3, and including hinge means for hinging the lip to the ramp and including a hinge pin, said sensor being located on the underside of the lip and being freely journalled for pivotal movement on said hinge pin.

5. The dockboard of claim 4, and including recess means in the undersurface of said lip to house said sensor, said sensor having a shorter length than said lip so that the sensor will lose contact with the carrier before the lip loses contact with the carrier as the carrier moves away from the dock.

6. The dockboard of claim 2, and including holding means responsive to the lip being in the extended position for holding the support leg in the inoperative position, biasing means for urging the leg to the supporting position, said means responsive to the sensor losing contact with said carrier acting to release said holding means and permit said biasing means to urge the support leg to the supporting position.

7. In a dockboard, a supporting structure, a ramp hinged at its rear edge to the supporting structure and movable between a generally horizontal cross traffic position and an upwardly inclined position, an extension lip hinged to the front edge of the ramp and movable between a downwardly hanging pendant position and an outwardly extending position, said lip when in the extended position adapted to engage a carrier located in front of the dock, lip lifting means operably connected to the lip for pivoting the lip from the pendant position to the extended position, a plurality of support legs hinged to the ramp and movable between a generally upright supporting position and a retracted position, means for biasing the legs toward the supporting position, means for moving the legs to the retracted position on upward movement of the lip from the pendant position toward the extended position, a sensor located on the underside of the lip and disposed to engage said carrier in conjunction with said lip, said sensor being movably mounted with respect to the lip and having a shorter length than said lip so that the sensor will lose contact with the carrier before the lip loses contact with the carrier as the carrier moves away from the dock, and means responsive to the sensor moving with respect to the lip as the sensor loses contact with the carrier for effecting operation of said biasing means to thereby move said legs to the supporting position and restrain downward movement of the ramp when the carrier moves out of contact with the lip.

8. The dockboard of claim 7, wherein said sensor is movably mounted between a downwardly hanging pendant position and an outwardly extending position, said dockboard including sensor lifting means for moving the sensor from the pendant position to the extended position.

9. The dockboard of claim 8, wherein said sensor lifting means is interconnected with the lip lifting means so that the sensor will be moved to the extended position in conjunction with the lip being moved to the extended position.

10. The dockboard of claim 9, and including lip latching means operably connected to the lip for latching the lip in the extended position.

11. The dockboard of claim 7, and including leg holding means responsive to the lip being in the extended position for holding the legs in the retracted position, said means responsive to the sensor moving with respect to the lip acting to release said holding means and permit said biasing means to urge said legs to the supporting position to restrain downward movement of the ramp.

12. In a dockboard, a supporting structure, a ramp hinged at its rear edge to the supporting structure and movable between a generally horizontal cross traffic position and an upwardly inclined position, an extension lip hinged to the front edge of the ramp and movable between a downwardly hanging pendant position and an outwardly extending position, said lip when in the extended position adapted to engage a carrier located in front of the dock, lip lifting means operably connected to the lip for pivoting the lip from the pendant position to the extended position, support means hinged to the ramp and movable between a generally upright supporting position and a retracted position, means for biasing the support means toward the supporting position, means responsive to movement of the lip from the pendant position toward the extended position for moving said support means to the retracted position, a sensor located on the underside of the lip and mounted for free pivotal movement with respect to the lip, said sensor being movable between a downwardly hanging pendant position and an outwardly extending position wherein said sensor is disposed to engage said carrier in conjunction with said lip, sensor lifting means for moving the sensor from the pendant position to the extended position, said sensor having a shorter length than the lip in a direction normal to the hinge axis of the lip so that the sensor will lose contact with the carrier before the lip loses contact with the carrier as the carrier moves away from the dock and said sensor will pivot downwardly towards its pendant position, and holding means for holding the support means in the retracted position, said holding means being operably connected to said sensor whereby downward pivotal movement of said sensor acts to release said holding means and enable said biasing means to pivot said support means to the suporting position and restrain downward movement of the ramp when the carrier moves out of contact with the lip.

13. The dockboard of claim 12, and including recess means in the undersurface of said lip, said sensor being located within said recess means.

14. The dockboard of claim 12, wherein said support means comprises a pair of support legs and said dockboard includes a sensor for each support leg, and connected means interconnecting sais sensors whereby said sensors can move in unison.

15. The dockboard of claim 14, wherein said connecting means comprises a connecting bar located on the undersurface of the lip.

16. The dockboard of claim 12, wherein said lip lifting means comprises an arm mounted for pivotal movement with respect to the hinge axis of the lip and having an end engageable with said lip, said sensor being connected to said arm.

17. In a dockboard, a supporting structure, a ramp hinged at its rear edge to the supporting structure and movable between a generally horizontal cross traffic position and an upwardly inclined position, an extension lip hinged to the front edge of the ramp and movable between a downwardly hanging pendant position and an outwardly extending position, said lip when in the extended position adapted to engage a carrier located in front of the dock, lip lifting means operably connected to the lip for pivoting the lip from the pendant position to the extended position, said lip lifting means comprising an arm mounted for pivotal movement about the hinge axis of the lip and having an end engageable with said lip, whereby pivotal movement of said arm will act to move the lip from the pendant position to the extended position, support means hinged to the ramp and movable between a generally upright supporting position and a retracted position, means for biasing the support means toward the supporting position, means responsive to movement of the lip from the pendant position toward the extended position for moving said support means to the retracted position, carrier sensing means connected to said lip lifting arm, said sensing means being located on the underside of the lip and disposed to engage the carrier in conjunction with said lip, and holding means for holding the support means in the retracted position, said sensing means having a shorter length than the lip in a direction normal to said hinge axis so that the sensing means will lose contact with the carrier before the lip loses contact with the carrier as the carrier moves away from the dock whereby said lip lifting means and said sensing means will freely pivot downwardly with respect to the extended lip, downward movement of said sensing means and said lip lifting arm acting to release said holding means and enable the biasing means to move said support legs to the supporting position to restrain downward movement of the ramp when the carrier moves out of contact with the lip.

* * * * *